United States Patent [19]

Aizawa et al.

[11] Patent Number: 4,824,903

[45] Date of Patent: Apr. 25, 1989

[54] HEAT-RESISTANT POLYORGANOSILOXANE COMPOSITION

[75] Inventors: Koichi Aizawa, Kamakura; Shingo Sewa, Odawara; Kiyoshi Mizushima, Yokosuka; Minoru Emoto, Ashigarakami, all of Japan

[73] Assignee: Dow Corning Kabushiki Kaisha, Tokyo, Japan

[21] Appl. No.: 936,875

[22] Filed: Dec. 2, 1986

[30] Foreign Application Priority Data

Dec. 25, 1985 [JP] Japan ................... 60-290386

[51] Int. Cl.$^4$ .............................. C08K 5/09
[52] U.S. Cl. ................... 524/772; 524/357; 524/398; 524/862; 524/780; 524/783; 524/785; 524/786; 525/478; 528/15; 528/31; 528/32
[58] Field of Search ............. 524/862, 773, 780, 783, 524/785, 786, 398, 770, 772, 357; 528/32, 31, 15; 525/478, 479

[56] References Cited

U.S. PATENT DOCUMENTS

| | | | |
|---|---|---|---|
| 3,284,406 | 11/1966 | Nelson | 528/15 |
| 3,436,366 | 1/1969 | Modic | 525/478 |
| 3,699,073 | 10/1972 | Wada | 524/862 |
| 4,182,824 | 1/1980 | Susuki et al. | 528/32 |
| 4,374,947 | 2/1983 | Toothill et al. | 524/398 |
| 4,405,425 | 9/1983 | Schiller et al. | 204/159.13 |
| 4,528,313 | 7/1985 | Swihart et al. | 524/397 |
| 4,604,424 | 8/1986 | Cole et al. | 524/433 |

FOREIGN PATENT DOCUMENTS

| | | | |
|---|---|---|---|
| 1172786 | 8/1984 | Canada . | |
| 58557 | 5/1978 | Japan . | |
| 4146897 | 11/1979 | Japan | 525/478 |

OTHER PUBLICATIONS

"The Vanderbilt Rubber Handbook", R. T. Vanderbilt Company, Inc., New York, N.Y., ©1958, pp. 165 and 257.

Primary Examiner—John C. Bleutge
Assistant Examiner—Ralph Dean, Jr.
Attorney, Agent, or Firm—Roger H. Borrousch

[57] ABSTRACT

A heat-resistant silicone rubber is obtained from a composition of a vinyl-containing polyorganosiloxane, a hydrogenpolyorganosiloxane, a platinum-containing catalyst, carbon black, and an acetylacetone salt of a metal wherein the metal can be copper, zinc, aluminum, iron, cerium, zirconium, or titanium. The silicone rubber can maintain its rubber properties at temperatures of 350° C. for prolonged periods of time.

6 Claims, No Drawings

HEAT-RESISTANT POLYORGANOSILOXANE COMPOSITION

BACKGROUND OF THE INVENTION

1. Field of the Invention

The present invention relates to a heat-resistant polyorganosiloxane composition.

2. Prior Art

Silicone elastomers are widely used in a variety of fields due to their excellent properties. Although such silicone elastomers have a better heat resistance than other rubbers, they still deteriorate within a short time in atmospheres hotter than 200° C. due to side chain oxidation and main chain decomposition in the molecular structure. This markedly reduces their rubber properties. For this reason, prior heat-resistant silicone rubbers cannot normally be used for extended periods of time at temperatures above 250° C.

For example, the addition to a polyorganosiloxane base of metal hydroxides or hydrated metal oxides, e.g., cerium hydroxide or hydrated aluminum oxide, or the addition of metal hydroxides or hydrated metal oxides and graphite, is known in the art as a means for further improving the heat resistance of flameproof room temperature-curable polyorganosiloxane compositions as described in Japanese Kokai Patent Publication No. 57-8250[1982], published Jan. 16, 1982, which is equivalent to Canadian Pat. No. 1,172,786, issued Aug. 14, 1984 to Wolfer et al, and assigned to Wacker Chemie GmbH. Another means for improving the heat resistance of silicone elastomers is the addition of iron oxide solid solutions, the ferrites, as described in Japanese Kokai Patent Publication No. 53-58557[1978], published May 26, 1978, to Toshiba Silicone KK.

SUMMARY OF THE INVENTION

Compositions obtained by prior art means generally do not have a satisfactory heat resistance. Their rubber properties are lost within a short time due to a significant thermal degradation occurring under severe high temperature conditions.

An object of the present invention is to resolve the aforementioned problems by proposing a heat-resistant polyorganosiloxane compositon with an excellent heat resistance and which maintains its rubber properties even after long periods of time at temperatures such as 350° C.

The present invention relates to a heat-resistant polyorganosiloxane composition comprising (A) a polyorganosiloxane having a viscosity at 25° C. of at least 0.1 Pa.s and having an average unit formula

$R_aR'_bSiO_{(4-a-b)/2}$ wherein R is vinyl group or allyl group; R' is a group selected from the group consisting of lower alkyl group, phenyl, and 3,3,3-trifluoropropyl; a is a number such that at least two R are present in each molecule; and a+b has an average value of from 1.8 to 2.3, (B) a hydrogenpolyorganosiloxane with a viscosity at 25° C. of from 0.001 to 100 Pa.s and having an average unit formula

$R''_cH_dSiO_{(4-c-d)/2}$ wherein R'' is a lower alkyl group or phenyl; d is a number such that at least two hydrogen atoms are present in each molecule; and c+d has an average value of from 1.8 to 3, the proportions of polyorganosiloxane (A) and hydrogenpolyorganosiloxane (B) are such that the number of —SiH in (B) is from 1.2 to 7.0 times the number of R in (A), (C) 0 to 20 weight percent of a siloxane copolymer formed from dimethylvinylsiloxy units, trimethylsiloxy units and SiO₂ units, based on the total weight of (A) and (B), (D) a platinum-containing catalyst in an amount to give from 1.0 to 1,000 ppm as platinum metal based on the total weight of (A), (B), and (C), (E) 1 to 30 weight percent of carbon black based on the total weight of (A), (B), and (C), and (F) 0.01 to 1.0 weight percent of acetylacetone salt of a metal based on the total weight of (A), (B), and (C).

DETAILED DESCRIPTION OF THE PREFERRED EMBODIMENTS

The heat-resistant polyorganosiloxane composition retains its excellent rubber properties even over long periods of time under high temperature conditions, such as 350° C.

The heat-resistant polyorganosiloxane composition of the present invention is made by adding the crosslinking hydrogenpolyorganosiloxane, (B), and optionally crosslinking siloxane copolymer, (C), to polyorganosiloxane, (A). The platinum-containing catalyst, (D), carbon black, (E), the acetylacetone salt of a metal, (E), and optionally other additives are then blended in by kneading.

Polyorganosiloxane, (A), has an average unit formula

$R_aR'_bSiO_{(4-a-b)/2}$ in which R is vinyl or allyl, R' is a lower alkyl such as methyl, ethyl, or propyl, or phenyl, or 3,3,3-trifluoropropyl, and a+b has a value from 1.8 to 2.3. At least two R groups must be present in each molecule, thus the value of a reflects this requirement. It is preferred that the R groups be at the ends of the molecular chains of (A). Although all of the R' groups may be methyl, the presence of some phenyl groups is preferable because this improves the heat resistance. (A) has a viscosity at 25° C. of at least 0.1 Pa.s and can range up to viscosities of several thousand pascal.seconds (Pa.s).

Hydrogenpolyorganosiloxane, (B), has an average unit formula

$R_cH_dSiO_{(4-c-d)/2}$ in which R'' is phenyl or a lower alkyl such as methyl, ethyl, or propyl, and c+d has a value of from 1.8 to 3. For (B) to have crosslinking properties, there must be at least two silicon-bonded hydrogen atoms present in each molecule, thus the value of d reflects this requirement. The viscosity of (B) at 25° C. must be in the range of from 0.001 to 100 Pa.s.

(A) and (B) are used in proportions such that the number of —SiH in (B) is from 1.2 to 7.0 times the total number of R groups in (A).

Siloxane copolymer, (C), is composed of dimethylvinylsiloxy units, trimethylsiloxy units, and SiO₂ units. The preferred molar ratio of dimethylvinylsiloxy units to trimethylsiloxy units to SiO₂ units is from 0.10:0.4:1 to 0.25:1.2:1. These siloxane copolymers can be produced by the usual methods. For example, by acidifying an aqueous solution of sodium silicate (pH being equal to or less than 5) followed by treatment with (CH₃)₃SiX in which X is a hydrolyzable group and also treatment with $(CH_3)_2(CH_2=CH)SiX$ in which X is a hydrolyzable group, heating, cooling, and then extracting with a water-insoluble solvent.

(C) is not an essential component of the present invention, however, its inclusion makes it possible to improve the properties of the final silicone rubber product and to limit the deterioration that occurs at high temperatures. The amount of (C) can range from 0 to 20 weight percent based on the total weight of (A) and (B).

The platinum-containing catalyst, (D), can be any of the well known platinum catalysts which are known to catalyze the hydrosilation reaction used to vulcanize these kinds of silicone rubber compositions. The amount of platinum-containing catalyst used is such that the amount of platinum metal ranges from 1.0 to 1,000 ppm based on the total weight of (A), (B), and (C). The preferred range is from 2 to 200 ppm. The use of more than 200 ppm may be uneconomical in relation to the effects obtained.

Carbon black, (E), can be various types such as furnace black, channel black, thermal black, and acetylene black. The amount used ranges from 1 to 30 weight percent based on the total weight of (A), (B), and (C). Preferably, (E) is present in amounts of from 3 to 20 weight percent, because it is difficult to obtain a good heat resistance when too much or too little carbon black is used.

The metal of the acetylacetone salts of a metal, (F), can be copper, zinc, aluminum, iron, cerium, zirconium, titanium, and other metals. The amount of (F) used ranges from 0.01 to 1.0 weight percent, preferably from 0.03 to 0.4 weight percent, based on the total weight of (A), (B), and (C).

Other additives such as silica powder, reinforcing silica, diatomaceous earth, colorants, reaction inhibitors may also be added to the compositions of the present invention.

The polyorganosiloxane composition of the present invention forms a silicone rubber with excellent heat resistance upon curing at room temperature or by heating. The compositions of the present invention can be used as an electric insulator, coating material, or potting material.

The present invention is illustrated by the following examples which in no way limit the invention which is properly delineated in the claims. In the following examples "parts" denotes parts by weight and the viscosity is the value at 25° C.

EXAMPLE 1

A base was prepared by mixing in a heated kneader, 60 parts of a polydimethylsiloxane terminated at both ends with vinyl group and having a viscosity of 30 Pa.s, 25 parts of a polydimethylsiloxane terminated at both ends with vinyl group and having a viscosity of 2 Pa.s, 5 parts of thermal black having a specific surface area of 16 m$^2$/g, 10 parts of reinforcing silica filler having a specific surface area of 200 m$^2$/g and which was hydrophobicized with hexamethyldisilazane, and 0.15 part of a chloroplatinic acid complex of sym-divinyltetramethyldisiloxane.

A heat-resistant polyorganosiloxane composition of the present invention was prepared by mixing with 100 parts of the base, 0.1 part of copper acetylacetone salt and 1.2 parts of hydrogenpolyorganosiloxane having the formula

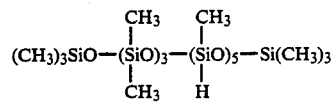

This composition was designated Sample 1 and the results obtained were as shown in the Table.

EXAMPLE 2

A heat-resistant polyorganosiloxane composition of the present invention was prepared as described in Example 1 except the amount of copper acetylacetone salt was 0.3 part instead of the 0.1 part. This composition was designated Sample 2 and the results obtained were as shown in the Table.

EXAMPLE 3

A heat-resistant polyorganosiloxane composition of the present invention was prepared as described in Example 1 with the exception that 0.1 part of cerium acetylacetone salt was used instead of the 0.1 part of copper acetylacetone salt. This composition was designated Sample 3 and the results obtained were as shown in the Table.

EXAMPLE 4

A heat-resistant polyorganosiloxane composition of the present invention was prepared as described in Example 1 with the exception that the amount of carbon black was 10 parts instead of the 5 parts. This composition was designated Sample 4 and the results obtained were as shown in the Table.

EXAMPLE 5

A heat-resistant polyorganosiloxane composition of the present invention was prepared as described in Example 1 with the exception that 20 parts of the polydimethylsiloxane having a viscosity of 2 Pa.s and 5 parts of a siloxane copolymer composed of dimethylvinylsiloxy units, trimethylsiloxy units, and SiO$_2$ having a molar ratio within the limits of 0.1~0.25:0.4~0.6:1 were used instead of the 25 parts of the polydimethylsiloxane having the viscosity of 2 Pa.s. This composition was designated Sample 5 and the results obtained were as shown in the Table.

COMPARISON EXAMPLE 1

A comparison polyorganosiloxane composition was prepared as described in Example 1 with the exception that the carbon black was left out. This composition was designated Comparison Sample 1 and the results obtained were as shown in the Table.

COMPARISON EXAMPLE 2

A comparison polyorganosiloxane composition was prepared as described in Example 4 with the exception that the copper acetylacetone salt was left out. This composition was designated Comparison Sample 2 and the results obtained were as shown in the Table.

Each of the samples and comparison samples obtained above were respectively poured into a sheet mold. Silicone rubber was produced by heating for 5 hours at 200° C. to vulcanize the composition. A part of each type of rubber was made into a test piece for conducting an aging test at 350° C. The timedependent variations in hardness and elasticity were measured every 24 hours according to the measurement methods of JIS K-6301. The results obtained are reported in the Table. Measurement of Comparison Sample 1 and Comparison Sample 2 at the aging time of 48 hours was impossible because of embrittlement of the test pieces.

TABLE

| Test Piece | Item | Aging Test (hours) | | | |
|---|---|---|---|---|---|
| | | 0 | 24 | 48 | 72 |
| Sample 1 | Hardness | 26 | 23 | 27 | 32 |
| | Elongation (%) | 400 | 260 | 200 | 180 |
| Sample 2 | Hardness | 26 | 25 | 27 | 30 |
| | Elongation (%) | 400 | 280 | 240 | 210 |
| Sample 3 | Hardness | 26 | 25 | 28 | 30 |
| | Elongation (%) | 400 | 290 | 260 | 220 |
| Sample 4 | Hardness | 31 | 27 | 30 | 34 |
| | Elongation (%) | 350 | 240 | 190 | 150 |
| Sample 5 | Hardness | 33 | — | — | 41 |
| | Elongation (%) | 310 | — | — | 140 |
| Comparison Sample 1 | Hardness | 24 | 49 | — | — |
| | Elongation (%) | 380 | 120 | — | — |
| Comparison Sample 2 | Hardness | 30 | 56 | — | — |
| | Elongation (%) | 350 | 80 | — | — |

Effects of the Invention

The present invention relates to a heat-resistant polyorganosiloxane composition with an excellent heat resistance. The rubber obtained from these compositions retains its rubber properties over long periods of time under high temperature conditions, such as at 350° C. This excellent heat-resistance is believed to be obtained from the combined effects of the platinum-containing catalyst, the carbon black, and the acetylacetone salt of a metal.

That which is claimed is:

1. A heat-resistant polyorganosiloxane composition comprising (A) a polyorganosiloxane having a viscosity at 25° C. of at least 0.1 Pa.s and having an average unit formula $$R_a R'SiO_{(4-a-b)/2}$$

wherein R is vinyl group or allyl group; R' is a group selected from the group consisting of lower alkyl group, phenyl, and 3,3,3-trifluoropropyl; a is a number such that at least two R are present in each molecule; and a+b has an average value of from 1.8 to 2.3, (B) a hydrogenpolyorganosiloxane with a viscosity at 25° C. of from 0.001 to 100 Pa.s and having an average unit formula $$R''_c H_d SiO_{(4-c-d)/2}$$

wherein R" is a lower alkyl group of phenyl; d is a number such that at least two hydrogen atoms are present in each molecule; and c+d has an average value of from 1.8 to 3, the proportions of polyorganosiloxane (A) and hydrogenpolyorganosiloxane (B) are such that the number of —SiH in (B) is from 1.2 to 7.0 times the number of R in (A).

(C) 0 to 20 weight percent of a siloxane copolymer formed from dimethylvinylsiloxy units, trimethylsiloxy units, and $SiO_2$ units, based on the total weight of (A) and (B), (D) a platinum-containing catalyst in an amount to give from 1.0 to 1,000 ppm as platinum metal based on the total weight of (A), (B), and (C), (E) 1 to 30 weight percent of carbon black based on the total weight of (A), (B), and (C), and (F) 0.01 to 1.0 weight percent of acetylacetone salt of a metal based on the total weight of (A), (B), and (C).

2. The heat-resistant polyorganosiloxane composition according to claim 1 further comprising a reinforcing silica filler.

3. The heat-resistant polyorganosiloxane composition according to claim 2 in which (A) is a vinyl endblocked polydimethylsiloxane having a viscosity at 25° C. of from 1 to 50 Pa.s, (E) is present in an amount of from 3 to 20 weight percent, (F) is present in an amount of from 0.3 to 0.4 weight percent, and the reinforcing silica is present in an amount of from 5 to 20 weight percent based on the total weight of (A), (B), and (C).

4. The heat-resistant polyorganosiloxane composition according to claim 3 in which (F) is copper acetylacetone salt.

5. The heat-resistant polyorganosiloxane composition according to claim 3 in which (F) is cerium acetylacetone salt.

6. The heat-resistant polyorganosiloxane composition according to claim 4 in which (C) is present in an amount of from 1 to 10 weight percent and the copolymer has a molar ratio of dimethylvinylsiloxy units to trimethylsiloxy units to $SiO_2$ of 0.1:0.4:1 to 0.25:1.2:1.

* * * * *